(12) United States Patent
Grosskopf et al.

(10) Patent No.: US 7,472,547 B2
(45) Date of Patent: Jan. 6, 2009

(54) HYDRAULIC DIFFERENTIAL FOR INTEGRATED DRIVE GENERATOR

(75) Inventors: Andrew P Grosskopf, Rockford, IL (US); Magdy A Kandil, Rockford, IL (US); Glenn C. Lemmers, Loves Park, IL (US); David S. Behling, Belvidere, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 217 days.

(21) Appl. No.: 11/588,014

(22) Filed: Oct. 26, 2006

(65) Prior Publication Data

US 2008/0098732 A1    May 1, 2008

(51) Int. Cl.
*F16H 39/10* (2006.01)
*F16H 61/48* (2006.01)

(52) U.S. Cl. .......................... 60/489; 60/487

(58) Field of Classification Search ............... 60/487, 60/489
See application file for complete search history.

(56) References Cited

U.S. PATENT DOCUMENTS

| | | | |
|---|---|---|---|
| 4,794,756 A | 1/1989 | Iseman | 60/489 |
| 5,070,696 A * | 12/1991 | Atake | 60/489 |
| 5,269,142 A * | 12/1993 | Atake | 60/487 |
| 7,117,672 B2 * | 10/2006 | Okuzaki et al. | 60/489 |
| 7,305,822 B2 * | 12/2007 | Ouchida et al. | 60/489 |

FOREIGN PATENT DOCUMENTS

| | | |
|---|---|---|
| EP | 0384759 | 8/1990 |
| JP | 2190670 | 7/1990 |
| JP | 4165150 | 6/1992 |

* cited by examiner

*Primary Examiner*—Thomas E Lazo
(74) *Attorney, Agent, or Firm*—Stephen G. Mican

(57) ABSTRACT

A hydraulic differential with a variable displacement hydraulic unit of the axial piston type, a fixed displacement hydraulic unit of the axial piston type, a stationary housing for mounting the hydraulic units, an input shaft for coupling to a variable speed power source and an output shaft for coupling to a constant speed load, comprises: a wobbler and a port plate for the variable displacement hydraulic unit coupled to the stationary housing; an axial block and piston set for the variable displacement hydraulic unit, a port plate for the fixed displacement hydraulic unit and a wobbler for the fixed displacement hydraulic unit coupled to the input shaft; and an axial block and piston set for the fixed displacement hydraulic unit coupled to the output shaft; wherein the variable displacement hydraulic unit port plate and the fixed displacement hydraulic unit port plate couple together through a circumferential interface to minimise hydraulic thrust forces developed by the hydraulic unit.

19 Claims, 5 Drawing Sheets

SECTION A-A

SECTION C-C

HYDRAULIC DIFFERENTIAL FOR INTEGRATED DRIVE GENERATOR

FIELD OF THE INVENTION

The invention relates to a hydraulic differential, and more particularly to a hydraulic differential that eliminates high hydraulic thrust loads that act on bearings or housing structure.

BACKGROUND OF THE INVENTION

A common type of hydraulic differential comprises a first axial piston hydraulic machine of variable displacement coupled to a second axial piston hydraulic machine of fixed displacement in such a fashion that driving one of the hydraulic machines at a certain rotational speed with a source of mechanical power whilst changing the phase and amplitude of displacement of the variable displacement machine relative to its porting causes a change in rotational speed of the undriven hydraulic machine. This operation is particularly useful for converting a source of mechanical power that has a variable rotational speed to a constant rotational speed. By changing the displacement of the variable hydraulic machine in proportion to the mechanical source speed changes, the output of the undriven hydraulic machine may remain constant.

It is common to configure the mechanical and hydraulic coupling of the hydraulic machines or units in such a hydraulic differential so that the variable and fixed displacement units have common rotational axes. Such an end-to-end arrangement is very compact and permits direct hydraulic coupling between the blocks of the hydraulic units with suitable port and valve plates. However, such an end-to-end arrangement also tends to generate high hydraulic thrust forces between the interfaces of the hydraulic units since they generate significant working pressure in operation. Consequently, the hydraulic differential requires large bearings to withstand these hydraulic thrust forces, adding to cost, weight and size of the hydraulic differential.

One design of hydraulic differential has a configuration that contains these hydraulic thrust forces in such a way that the differential does not require large bearings is described in Iseman, U.S. Pat. No. 4,794,756. This differential has a structure that clamps the wobbler for the fixed displacement hydraulic unit to the block and piston set for the variable displacement hydraulic unit, thereby containing all the hydraulic thrust forces so that it does not require large bearings. One disadvantage is that the variable and fixed port plates needs to be shimmed close together to minimize leakage between the variable and fixed blocks port plates or the piece parts that clamp around the port plate need to be machined to impractical tolerances.

SUMMARY OF THE INVENTION

The invention comprises a hydraulic differential that has radial dynamic porting between the variable and fixed displacement hydraulic units to avoid large hydraulic thrust forces between them and allows for reasonable manufacturing tolerances in the porting method.

Generally, the invention comprises a hydraulic differential with a variable displacement hydraulic unit of the axial piston type, a fixed displacement hydraulic unit of the axial piston type, a stationary housing for mounting the hydraulic units, an input shaft for coupling to a variable speed power source and an output shaft for coupling to a constant speed load, comprising: a wobbler and a port plate for the variable displacement hydraulic unit coupled to the stationary housing; an axial block and piston set for the variable displacement hydraulic unit, a port plate for the fixed displacement hydraulic unit and a wobbler for the fixed displacement hydraulic unit coupled to the input shaft; and an axial block and piston set for the fixed displacement hydraulic unit coupled to the output shaft; wherein the variable displacement hydraulic unit port plate and the fixed displacement hydraulic unit port plate couple together through a circumferential interface to minimise hydraulic thrust forces developed by the hydraulic units.

DETAILED DESCRIPTION OF THE INVENTION

A hydraulic differential that is suitable for incorporating the invention comprises a variable and fixed axial piston machine combination. This combination works to maintain a constant output rotational speed for a predetermined input rotational speed range. In this way, it converts a variable speed power source, such as an engine, to a constant speed that is suitable for powering a constant speed device, such as a fixed frequency alternating current generator.

Figure 1:
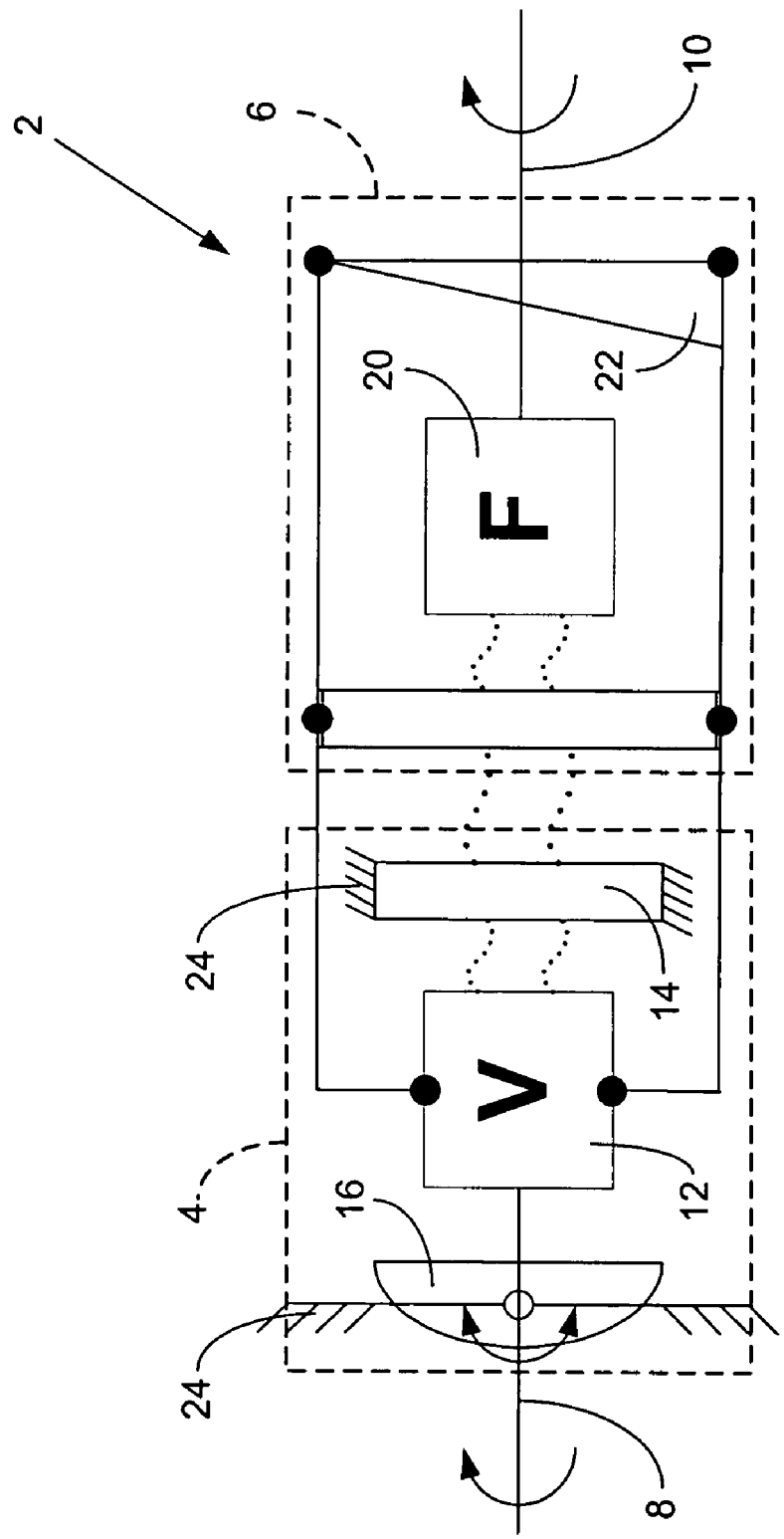
FIG. 1 is a block diagram of a hydraulic differential that is suitable for incorporating the invention.

FIG. 1 is a block diagram of a hydraulic differential 2 that is suitable for incorporating the invention. The hydraulic differential 2 comprises a variable displacement hydraulic unit 4, a fixed displacement hydraulic unit 6, an input power shaft 8 and an output power shaft 10. The variable displacement hydraulic unit 4 comprises a variable unit block and piston set 12, a variable unit port plate 14 and a variable unit wobbler 16. The fixed displacement hydraulic unit 6 comprises a fixed unit block and piston set 18, a fixed unit port plate 20 and a fixed unit wobbler 22.

The input shaft 8 rotates the variable block and piston set 12, the fixed unit port plate 20 and the fixed unit wobbler 22. The fixed unit block and piston set 18 rotates the output shaft 10. The operation of the hydraulic differential 2 is such that in order for the rotational speed of the fixed unit block and piston set 18 to add or subtract from the rotational speed of the variable block and piston set 12, the variable unit port plate 14 and the variable unit wobbler 16 must be stationary with respect to the rotational movement of the variable block and piston set 12, the fixed unit port plate 20 and the fixed unit wobbler 22 that the input shaft 8 drives, such as by fastening them to a stationary frame or housing 24. Thus, the input shaft 8 rotates the variable unit block and piston set 12, the fixed unit port plate 20 and the fixed unit wobbler 22 together as a single unit. Likewise, the fixed unit block and piston set 18 rotates the output shaft 10 as a single unit.

With this configuration, the porting between the stationary variable unit port plate 14 and the rotating fixed unit port plate 20 is dynamic. Furthermore, if the dynamic porting interface between them comprises planar surfaces that are normal to the axes of the input shaft 8 and the output shaft 10, high hydrostatic separating forces may develop between them due to the working pressure of the variable displacement hydraulic unit 4 and the fixed displacement hydraulic unit 6. Therefore, according to the invention, the dynamic porting interface between the stationary variable unit port plate 14 and the rotating fixed unit port plate 20 comprises a generally circumferential radial porting interface and radial porting between generally cylindrical axial surfaces.

Figure 2:
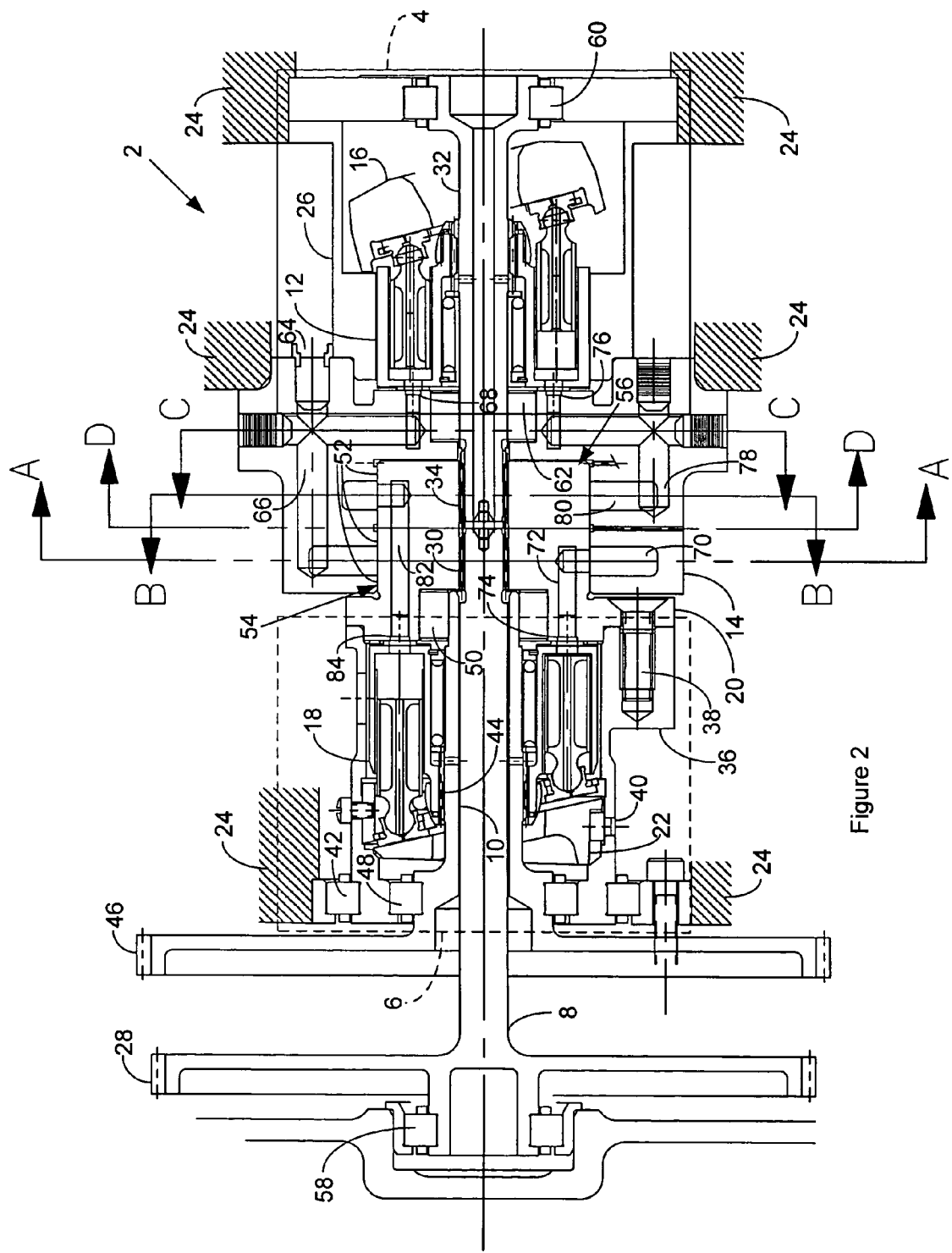
FIG. 2 is a cut-away side view of a hydraulic differential according to a possible embodiment of the invention.

FIG. 2 is a cut-away side view of a hydraulic differential 2 according to a possible embodiment of the invention. The hydraulic differential 2 contains the variable displacement hydraulic unit 4 and the fixed displacement hydraulic unit 6 within its stationary housing 24. The stationary variable unit port plate 14 attaches to the stationary housing 24. The variable unit wobbler 16 attaches to the stationary housing 24 by way of a variable wobbler housing 26.

A variable speed power source, such as a gas turbine engine (not shown) drives the input power shaft 8, typically by way of an input gear 28. The input shaft 8 drives the variable unit block and piston set 12, the fixed unit rotating port plate 20 and the fixed unit wobbler 22 that couple to it. In FIG. 2, the fixed unit rotating port plate 20 couples to the input power shaft 8 by way of a spline 30 on the input shaft 8. The variable unit block and piston set 12 couples to the input shaft 8 by way of a variable block shaft 32 and a spline 34 that couples to the fixed unit rotating port plate 12. The fixed unit wobbler 22 couples to the input shaft 8 by way of a fixed unit housing 36 that couples to the fixed unit rotating port plate 20 with a plurality of fasteners 38. A key or pin 40 prevents rotation of the fixed unit wobbler 22 relative to the fixed unit housing 36. The stationary frame 24 supports the other end of the fixed unit housing 36 by way of a fixed unit housing roller bearing 42.

The fixed block and piston set 18 drives the output shaft 10. In FIG. 2, the fixed block and piston set 18 couples to the output shaft 10 by way of a spline 44. The output shaft 10 adds or subtracts speed to a shaft (not shown) that drives a constant speed load, such as a generator (not shown), by way of an output gear 46. The fixed unit housing 36 supports one end of the output shaft 10 by way of an output side roller bearing 48. The rotating fixed unit port plate 20 supports the other end of the output shaft 10 by way of an output shaft journal bearing 50.

The stationary variable unit port plate 14 supports the rotating fixed unit port plate 20 by way of an interface journal bearing 52 that comprises a generally cylindrical end 54 of the rotating fixed port plate 20 and a generally cylindrical undercut and orifice 56 in the stationary variable unit port plate 14 that receives the cylindrical end 54. The cylindrical undercut and orifice 56 prevents pressure from building on the cylindrical end 54 and developing a separating force. The input shaft 8 rotates coaxially within the output shaft 10 with additional end support from an input side roller bearing 58. A variable unit roller bearing 60 that mounts in the variable wobbler housing 26 and variable unit journal bearing 62 that mounts in the stationary variable unit port plate 20 supports the variable block shaft 32.

The stationary variable unit port plate 14 receives low pressure charging fluid from the stationary housing 24 by way of charging fluid supply port 64 for a charging fluid supply manifold 66 within the stationary variable unit port plate 14. The charging fluid supply manifold 66 distributes charging fluid to the variable unit block and piston set 18 by way of a variable unit charging fluid port 68 in the stationary variable unit port plate 14. The charging fluid supply manifold 66 also distributes charging fluid to the rotating fixed unit port plate 20 by way of a charging fluid annulus 70 along a circumferential interface between the cylindrical end 54 of the rotating fixed unit port plate 20 and the cylindrical orifice 56 in the stationary variable unit port plate 14 that comprises the interface journal bearing 52. The fixed unit block and piston set 18 receives the charging fluid from the rotating fixed unit port plate 20 by way of a fixed unit charging fluid passage 72 and fixed unit charging fluid port 74 within the rotating fixed unit port plate 20 that couple to the charging fluid annulus 70. The supply of charging fluid compensates for fluid that is lost due to leakage caused by charge and working pressure.

High pressure working fluid communicates between the variable unit block and piston set 12 and the fixed unit block and piston set 18 by way of a variable unit working fluid port 76 and a variable unit working fluid passage 78 within the stationary variable unit port plate 14, a working fluid annulus 80 along the circumferential interface between the cylindrical end 54 of the rotating fixed unit port plate 20 and the 6stationary variable unit port plate 14 that comprises the interface journal bearing 52, a fixed unit working fluid passage 82 and a fixed unit working fluid port 84 within the rotating fixed unit port plate 20 that communicates with the working fluid annulus 80.

Figure 3:
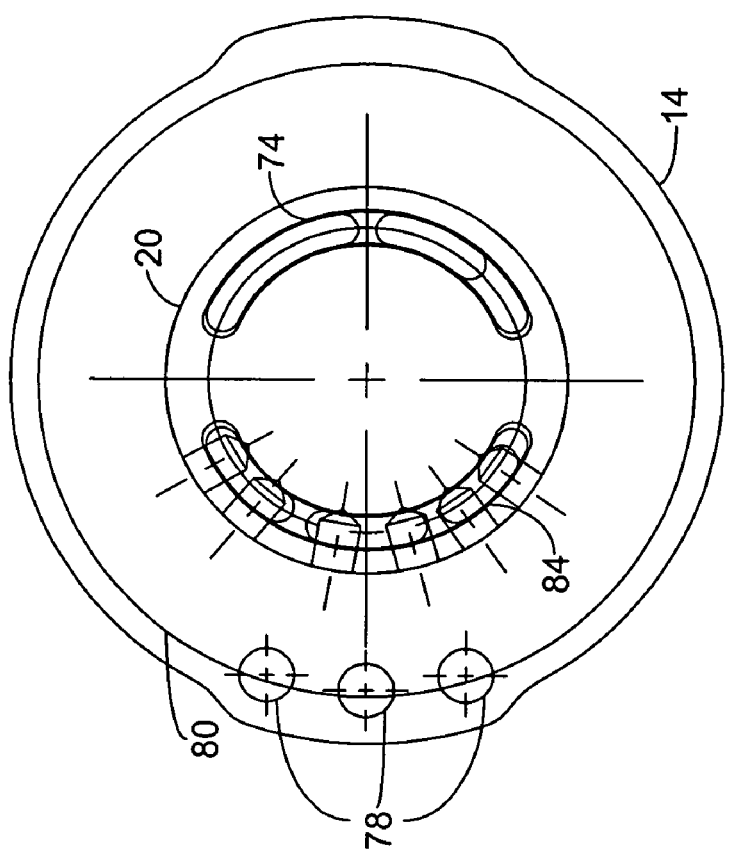
FIG. 3 is a sectional cut-away view of high pressure porting for the hydraulic differential shown in FIG. 2.
Figure 4:
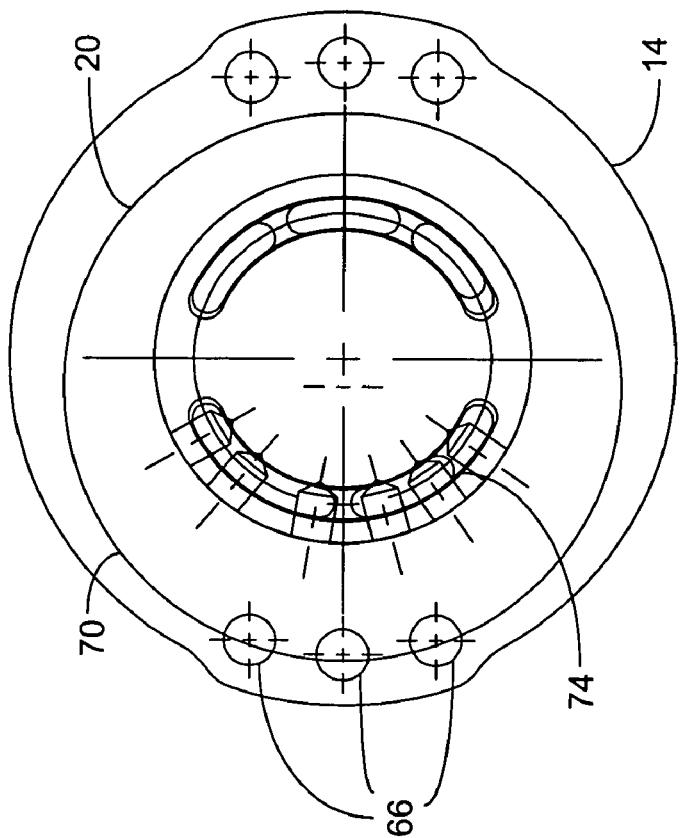
FIG. 4 is a sectional cut-away view of low pressure porting for the hydraulic differential shown in FIG. 2.
Figure 5:
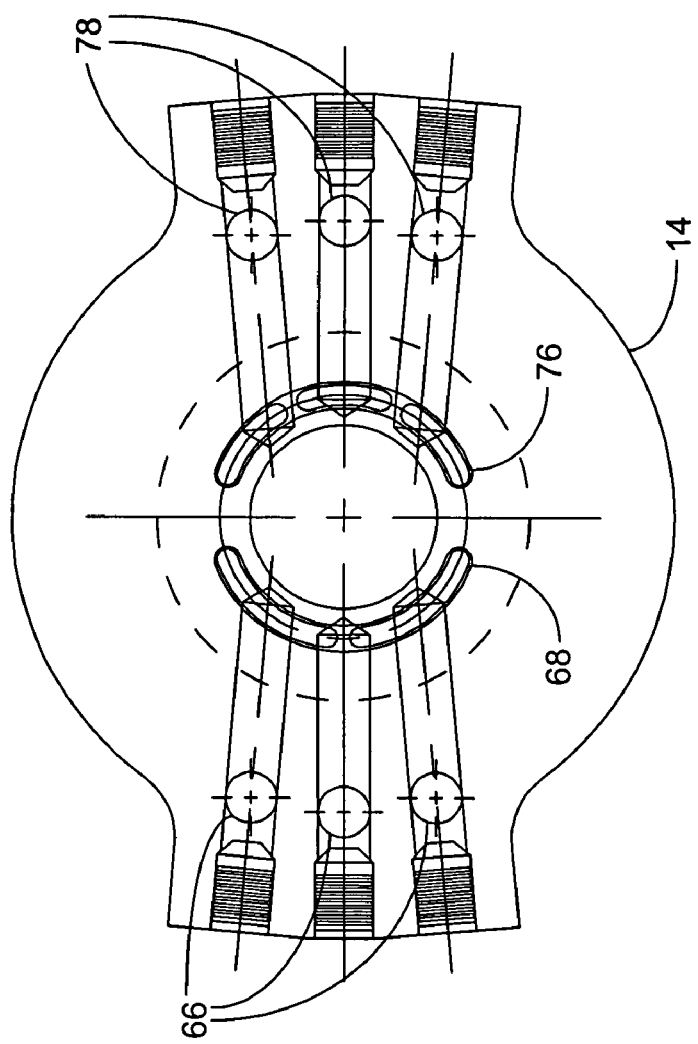
FIG. 5 is a sectional cut-away view of oil transfer passages for the hydraulic differential shown in FIG. 2.

FIG. 3 is a cut-away side view of the hydraulic differential 2 shown in FIG. 2 along a section A-A of the stationary variable unit port plate 14 and the rotating fixed unit port plate 20 through the charging fluid annulus 44. FIG. 4 is a cut-away side view of the hydraulic differential 2 shown in FIG. 2 along a section B-B of the stationary variable unit port plate 14 and the rotating fixed unit port plate 20 through the working fluid annulus 80. FIG. 5 is a cut-away side view of the hydraulic differential 2 shown in FIG. 2 along a section C-C of the stationary variable unit port plate 14 through the charging fluid manifold 66 and the variable unit working fluid transfer tube 78.

In operation, the variable speed power source rotates the input gear 28 to rotate the input shaft 8, which in turn rotates the variable unit block and piston set 12, the rotating fixed unit port plate 20 and the fixed unit wobbler 22. The rotational speeds of the input shaft 8, the variable unit block and piston set 12, the rotating fixed unit port plate 20 and the fixed unit wobbler 22 are therefore proportional to the rotational speed of the variable speed power source.

A control system (not shown) senses any deviation of these rotational speeds from a desired set point and changes the angle of the variable unit 16 wobbler to change the displacement of the variable block and piston set 14. When the control system senses no deviation of the rotational speeds from the set point, it adjusts the position of the variable unit wobbler 16 to be perpendicular to the centreline of the input shaft 8, or zero degrees. When the position of the variable unit wobbler 16 is at zero degrees, there is no fluid flow between the variable block and piston set 12 and the fixed block and piston set 18. In this case, the fixed block and piston set 18 hydraulically locks to the variable block and piston set 12 so that the rotational speed of the fixed block and piston set 18 is the same as the variable block and piston set, a condition of "straight through" speed. The rotational speed of the output shaft 10 is then the same as the rotational speed of the input shaft 8 and the rotational speed of a constant speed load coupled to the output gear 44 is proportional to their rotational speed.

If the control system senses that the rotational speeds of the variable speed power source and the input shaft 8 deviate above the set point, the control system adjusts the position of the variable unit wobbler 16 at an angle from normal to the centreline of the input shaft 8 as shown in FIG. 1. The fixed unit block and piston set 18 begins to rotate relative to the variable unit block and piston set 12 because fluid starts to flow between them. In this instance, the fixed unit block and piston set 18 acts as a pump and the variable unit block and piston set 12 acts as a motor. The direction of rotation of the fixed unit block and piston set 18 is opposite that of the variable unit block and piston set 12 so that the rotational speed of the output shaft 10 is that of the variable unit block and piston set 12 minus that of the fixed unit block and piston set 18.

Likewise, if the control system senses that the rotational speed of the rotational speeds of the variable speed power source and the input shaft 8 deviate below the set point, the control system adjusts the position of the variable unit wobbler 16 at an angle from normal to the centreline of the input shaft 8 opposite to that shown in FIG. 1. The fixed unit block and piston set 18 once again begins to rotate relative to the variable unit block and piston set 12 because fluid starts to flow between them. In this instance, the variable unit block and piston set 12 acts as a pump and the fixed unit block and piston set 18 acts as a motor. The direction of rotation of the fixed unit block and piston set 18 is the same as that of the variable unit block and piston set 12 so that the rotational speed of the output shaft 10 is that of the variable unit block and piston set 12 plus that of the fixed unit block and piston set 18.

Because the charging fluid and the working fluid passes between the stationary variable unit port plate 12 and the rotating fixed unit port plate 20 flows axially through the circumferential interface between the cylindrical end 54 of the rotating fixed unit port plate 20 and the cylindrical orifice 56 in the stationary variable unit port plate 12 that comprises the interface journal bearing 52, most of the resulting hydraulic thrust force exerts itself on the interface radially instead of axially, thereby containing all the hydraulic thrust forces so that the hydraulic differential 2 does not require large bearings. This reduces size, weight and cost of the hydraulic differential 2.

The described embodiments of the invention are only some illustrative implementations of the invention wherein changes and substitutions of the various parts and arrangement thereof are within the scope of the invention as set forth in the attached claims.

The claimed invention is:

1. A hydraulic differential with a variable displacement hydraulic unit of the axial piston type, a fixed displacement hydraulic unit of the axial piston type, a stationary housing for mounting the hydraulic units, an input shaft for coupling to a variable speed power source and an output shaft for coupling to a constant speed load, wherein the input and output shafts extend out of a single end of the stationary housing, comprising:

a wobbler and a port plate for the variable displacement hydraulic unit coupled to the stationary housing;

an axial block and piston set for the variable displacement hydraulic unit, a port plate for the fixed displacement hydraulic unit and a wobbler for the fixed displacement hydraulic unit coupled to the input shaft; and an axial block and piston set for the fixed displacement hydraulic unit coupled to the output shaft;

wherein the variable displacement hydraulic unit port plate and the fixed displacement hydraulic unit port plate couple together through a circumferential interface to minimise hydraulic thrust forces developed by the hydraulic units.

2. The hydraulic differential of claim 1, wherein the circumferential interface comprises a generally cylindrical orifice in the variable displacement unit port plate that receives a generally cylindrical end of the fixed displacement unit port plate.

3. The hydraulic differential of claim 1, wherein the variable displacement unit port plate receives charging fluid and distributes it to the fixed displacement unit port plate through a charging fluid annulus along the circumferential interface between them.

4. The hydraulic differential of claim 1, wherein working fluid communicates between the variable displacement unit port plate and the fixed displacement unit port plate through a working fluid annulus along the circumferential interface between them.

5. The hydraulic differential of claim 1, wherein the input shaft coaxially mounts within the output shaft.

6. The hydraulic differential of claim 1, wherein the variable displacement hydraulic unit and the fixed displacement hydraulic unit are in radial alignment with the input and output shafts.

7. The hydraulic differential of claim 1, wherein the circumferential interface comprises a bearing for supporting the fixed displacement hydraulic unit port plate with the variable displacement unit port plate.

8. A hydraulic differential with a variable displacement hydraulic unit of the axial piston type, a fixed displacement hydraulic unit of the axial piston type, a stationary housing for mounting the hydraulic units in generally radial alignment with each other, an input shaft for coupling to a variable speed power source and an output shaft for coupling to a constant speed load, comprising:

a wobbler and a port plate for the variable displacement hydraulic unit coupled to the stationary housing;

an axial block and piston set for the variable displacement hydraulic unit, a port plate for the fixed displacement hydraulic unit and a wobbler for the fixed displacement hydraulic unit coupled to the input shaft; and an axial block and piston set for the fixed displacement hydraulic unit coupled to the output shaft;

wherein the variable displacement hydraulic unit port plate and the fixed displacement hydraulic unit port plate couple together through a circumferential interface comprising a generally cylindrical orifice in the variable displacement unit port plate that receives a generally cylindrical end of the fixed displacement unit port plate to minimise hydraulic thrust forces developed by the hydraulic units.

9. The hydraulic differential of claim 8, wherein the variable displacement unit port plate receives charging fluid and distributes it to the fixed displacement unit port plate through a charging fluid annulus along the circumferential interface between them.

10. The hydraulic differential of claim 8, wherein working fluid communicates between the variable displacement unit port plate and the fixed displacement unit port plate through a working fluid annulus along the circumferential interface between them.

11. The hydraulic differential of claim 8, wherein the input shaft coaxially mounts within the output shaft.

12. The hydraulic differential of claim 8, wherein the variable displacement hydraulic unit and the fixed displacement hydraulic unit are in radial alignment with the input and output shafts.

13. The hydraulic differential of claim 8, wherein the input and output shafts extend out of a single end of the stationary housing.

14. The hydraulic differential of claim 8, wherein the circumferential interface comprises a bearing for supporting the fixed displacement hydraulic unit port plate with the variable displacement unit port plate.

15. A hydraulic differential with a variable displacement hydraulic unit of the axial piston type, a fixed displacement hydraulic unit of the axial piston type, a stationary housing for mounting the hydraulic units in generally radial alignment with each other, an input shaft for coupling to a variable speed power source and an output shaft for coupling to a constant speed load, comprising:

a wobbler and a port plate for the variable displacement hydraulic unit coupled to the stationary housing;

an axial block and piston set for the variable displacement hydraulic unit, a port plate for the fixed displacement hydraulic unit and a wobbler for the fixed displacement hydraulic unit coupled to the input shaft; and an axial block and piston set for the fixed displacement hydraulic unit coupled to the output shaft;

wherein the variable displacement hydraulic unit port plate and the fixed displacement hydraulic unit port plate couple together through a circumferential interface comprising a generally cylindrical orifice in the variable displacement unit port plate that receives a generally cylindrical end of the fixed displacement unit port plate, a charging fluid annulus that distributes charging fluid from the variable displacement hydraulic unit port plate to the fixed displacement hydraulic unit port plate, and a working fluid annulus that distributes working fluid between the variable displacement unit port plate and the fixed displacement unit port plate to minimise hydraulic thrust forces developed by the hydraulic units.

16. The hydraulic differential of claim 15, wherein the input shaft coaxially mounts within the output shaft.

17. The hydraulic differential of claim 15, wherein the variable displacement hydraulic unit and the fixed displacement hydraulic unit are in radial alignment with the input and output shafts.

18. The hydraulic differential of claim 15, wherein the input and output shafts extend out of a single end of the stationary housing.

19. The hydraulic differential of claim 15, wherein the circumferential interface comprises a bearing for supporting the fixed displacement hydraulic unit port plate with the variable displacement unit port plate.

* * * * *